(12) United States Patent
Okawa et al.

(10) Patent No.: US 10,788,620 B2
(45) Date of Patent: Sep. 29, 2020

(54) LIGHT EMITTING DEVICE, DISPLAY APPARATUS, AND SUBSTRATE

(71) Applicant: Sharp Kabushiki Kaisha, Sakai, Osaka (JP)

(72) Inventors: Yuki Okawa, Sakai (JP); Masashi Yokota, Sakai (JP)

(73) Assignee: SHARP KABUSHIKI KAISHA, Sakai, Osaka (JP)

(*) Notice: Subject to any disclaimer, the term of this patent is extended or adjusted under 35 U.S.C. 154(b) by 10 days.

(21) Appl. No.: 16/270,510

(22) Filed: Feb. 7, 2019

(65) Prior Publication Data

US 2019/0243060 A1 Aug. 8, 2019

(30) Foreign Application Priority Data

Feb. 7, 2018 (JP) ................. 2018-020312

(51) Int. Cl.
| | | |
|---|---|---|
| *H04N 5/64* | (2006.01) | |
| *F21V 8/00* | (2006.01) | |
| *G02F 1/133* | (2006.01) | |

(52) U.S. Cl.
CPC ......... *G02B 6/0088* (2013.01); *G02B 6/0031* (2013.01); *G02B 6/0055* (2013.01); *G02B 6/0085* (2013.01); *G02B 6/0091* (2013.01); *G02F 1/133* (2013.01); *H04N 5/64* (2013.01); *G02B 6/0068* (2013.01); *G02B 6/0073* (2013.01)

(58) Field of Classification Search
CPC .. G02B 6/0088; G02B 6/0091; G02B 6/0031; G02B 6/0055; G02B 6/0085; G02B 6/0073; G02B 6/0068; G02B 6/0083; G02B 6/0086; G02F 1/133; G02F 1/133615; H04N 5/64
See application file for complete search history.

(56) References Cited

U.S. PATENT DOCUMENTS

| | | | | |
|---|---|---|---|---|
| 2007/0279944 | A1* | 12/2007 | Sakai | G02B 6/0031 362/633 |
| 2008/0284308 | A1* | 11/2008 | Pang | G09F 13/18 313/498 |
| 2009/0316064 | A1* | 12/2009 | Kono | G02F 1/133615 349/58 |
| 2013/0026500 | A1* | 1/2013 | Kim | C09K 11/7734 257/88 |
| 2013/0229827 | A1* | 9/2013 | Takase | G02B 6/0031 362/609 |

(Continued)

FOREIGN PATENT DOCUMENTS

JP 2015-092235 A 5/2015

*Primary Examiner* — Huyen L Ngo
(74) *Attorney, Agent, or Firm* — ScienBiziP, P.C.

(57) ABSTRACT

A light emitting device is installed in a display apparatus such as that used in a television set. The light emitting device includes a light source that emits light, a light guiding plate having a light receiving portion that receives light from the light source, and a substrate having a wiring pattern that is electrically connected to the light source. The substrate is bent and disposed so as to cover a space between the light source and the light receiving portion. The light guiding plate emits the received light toward, for example, a liquid crystal panel. The liquid crystal panel displays images by causing each of pixels to transmit or block light irradiated.

7 Claims, 8 Drawing Sheets

(56) References Cited

U.S. PATENT DOCUMENTS

| | | | | |
|---|---|---|---|---|
| 2014/0003089 A1* | 1/2014 | Yu | ................ | G02B 6/0085 |
| | | | | 362/609 |
| 2014/0020882 A1 | 1/2014 | Konishi | ................ | F21S 41/141 |
| | | | | 165/185 |
| 2014/0293372 A1* | 10/2014 | Okamoto | ............ | H04N 1/0285 |
| | | | | 358/475 |
| 2014/0307204 A1* | 10/2014 | Nakano | ................ | G02B 6/0085 |
| | | | | 349/65 |
| 2015/0212261 A1* | 7/2015 | Masuda | ................ | H04N 5/645 |
| | | | | 348/794 |
| 2015/0219821 A1* | 8/2015 | Seo | ................ | G02B 6/0023 |
| | | | | 362/608 |
| 2015/0288842 A1* | 10/2015 | Enomoto | ............ | H04N 1/02855 |
| | | | | 358/474 |
| 2016/0092030 A1* | 3/2016 | Byun | ................ | G06F 3/046 |
| | | | | 345/175 |
| 2016/0209579 A1* | 7/2016 | Park | ................ | G02B 6/0085 |
| 2016/0231490 A1* | 8/2016 | Yamakawa | ............ | G02B 6/0055 |

* cited by examiner

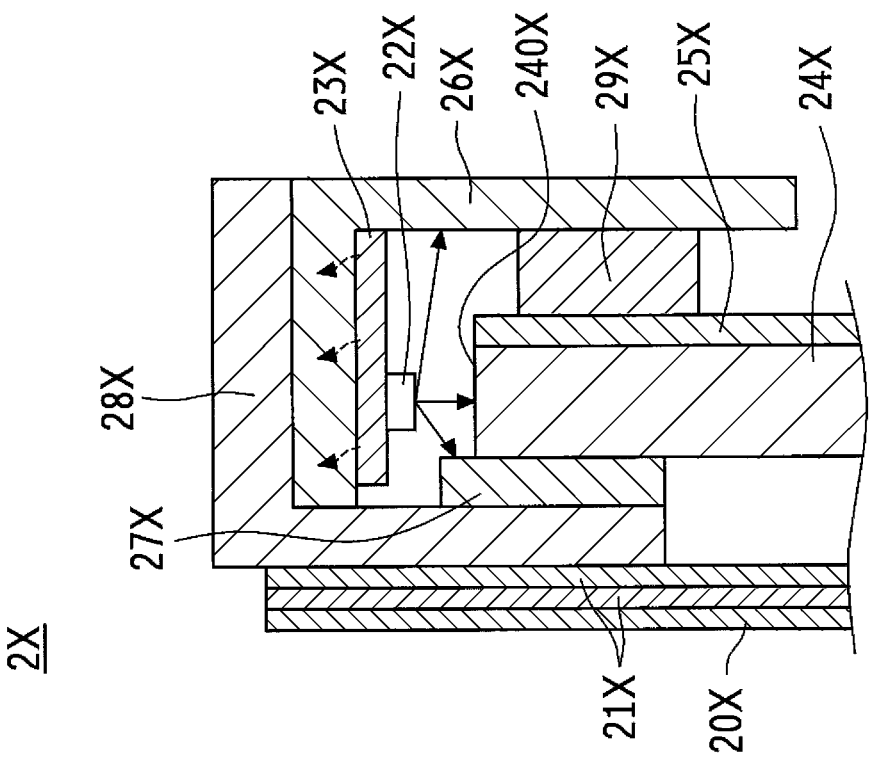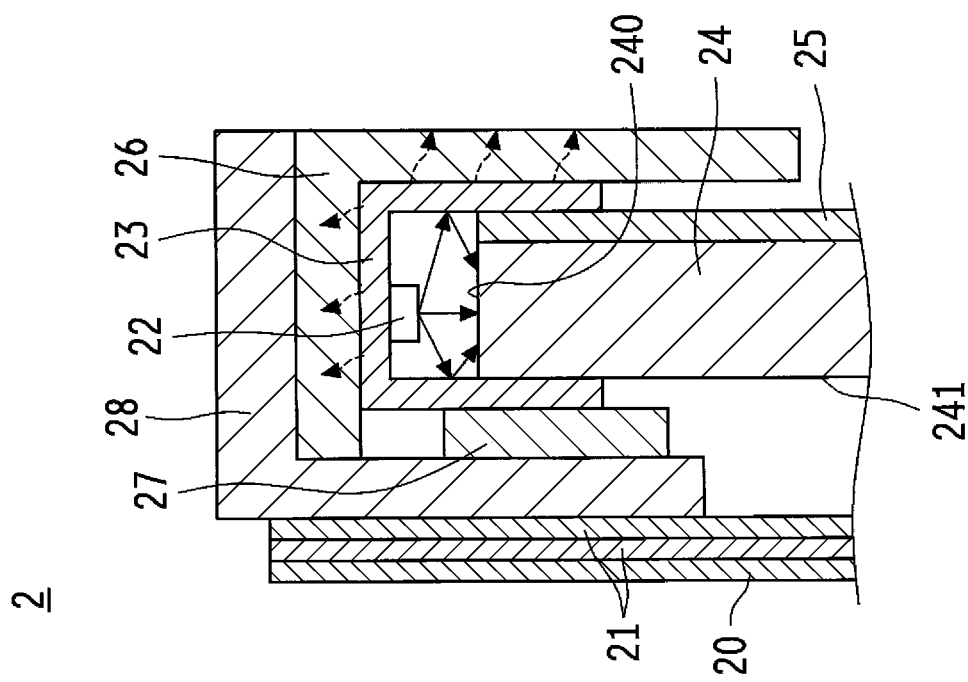

LIGHT EMITTING DEVICE, DISPLAY APPARATUS, AND SUBSTRATE

BACKGROUND

1. Field

The present disclosure relates to a light emitting device, a display apparatus that uses the light emitting device, and a substrate to be used in the light emitting device.

2. Description of the Related Art

Liquid crystal display apparatuses, such as those included in liquid crystal television sets, have been widely used and various types of liquid crystal display apparatuses have been proposed.

For example, Japanese Unexamined Patent Application Publication No. 2015-92235 discloses a liquid crystal display apparatus in which LED chips are disposed so as to oppose a side end of a light guiding plate, as illustrated in FIGS. 1 to 4, 7, 8, and 10.

The liquid crystal display apparatus as described in Japanese Unexamined Patent Application Publication No. 2015-92235 uses a light emitting device that provides backlight and is expected to provide high luminance. One method of increasing the luminance of backlighting is to increase electric power for backlighting.

However, increasing electric power for backlighting leads to a problem that the surface temperature of an LED substrate on which LED chips are mounted also increases.

SUMMARY

The present disclosure has been made in such circumstances. It is desirable to provide a light emitting device that can emit high luminance backlight without increasing electric power.

It is also desirable to provide a display apparatus that uses the light emitting device according to the present disclosure.

It is also desirable to provide a substrate that can be used in the light emitting device according to the present disclosure.

According to an aspect of the disclosure, there is provided a light emitting device that includes a light source that emits light, a light guiding plate having a light receiving portion that receives the light from the light source, and a substrate having a wiring pattern that is electrically connected to the light source. In the light emitting device, the light guiding plate is a light emitting device that emits the light received by the light receiving portion, and the substrate is bent and disposed so as to cover a space between the light source and the light receiving portion.

According to another aspect of the disclosure, there is provided a light emitting device that includes a light source that emits light, a light guiding plate that has a first surface and a second surface opposing the first surface and has a light receiving portion that receives the light from the light source and guides the received light between the first surface and the second surface, a substrate having a wiring pattern that is electrically connected to the light source. In the light emitting device, the substrate has a first edge portion and a second edge portion and is disposed at a position opposite to the light guiding plate with respect to the light source, the first edge portion is bent toward the first surface of the light guiding plate and the second edge portion is bent toward the second surface of the light guiding plate, and the first edge portion and the second edge portion cover an optical path from the light source to the light receiving portion.

According to still another aspect of the disclosure, there is provided a display apparatus that includes the light emitting device and a liquid crystal panel that is irradiated with light emitted from the light guiding plate disposed in the light emitting device.

According to still another aspect of the disclosure, there is provided a substrate to be used in the light emitting device. The substrate includes a wiring pattern formed thereon, the wiring pattern being electrically connected to a light source that emits light to be received by a light receiving portion of a light guiding plate. The substrate is bendable so as to cover a space between the light source and the light receiving portion.

BRIEF DESCRIPTION OF THE DRAWINGS

FIG. 5A is a view schematically illustrating an exemplary cross section of part of the light emitting device according to the present disclosure;

FIG. 5B is a view schematically illustrating an exemplary cross section of part of a known light emitting device;

DESCRIPTION OF THE EMBODIMENTS

Embodiments according to the present disclosure will be described with reference to the drawings. Note that the embodiments described below are examples in which the technical idea is embodied, and accordingly the embodiments should not be construed as limiting the technical scope of the present disclosure.

First Embodiment

Shapes of Display Apparatus and Light Emitting Device

Figure 1:
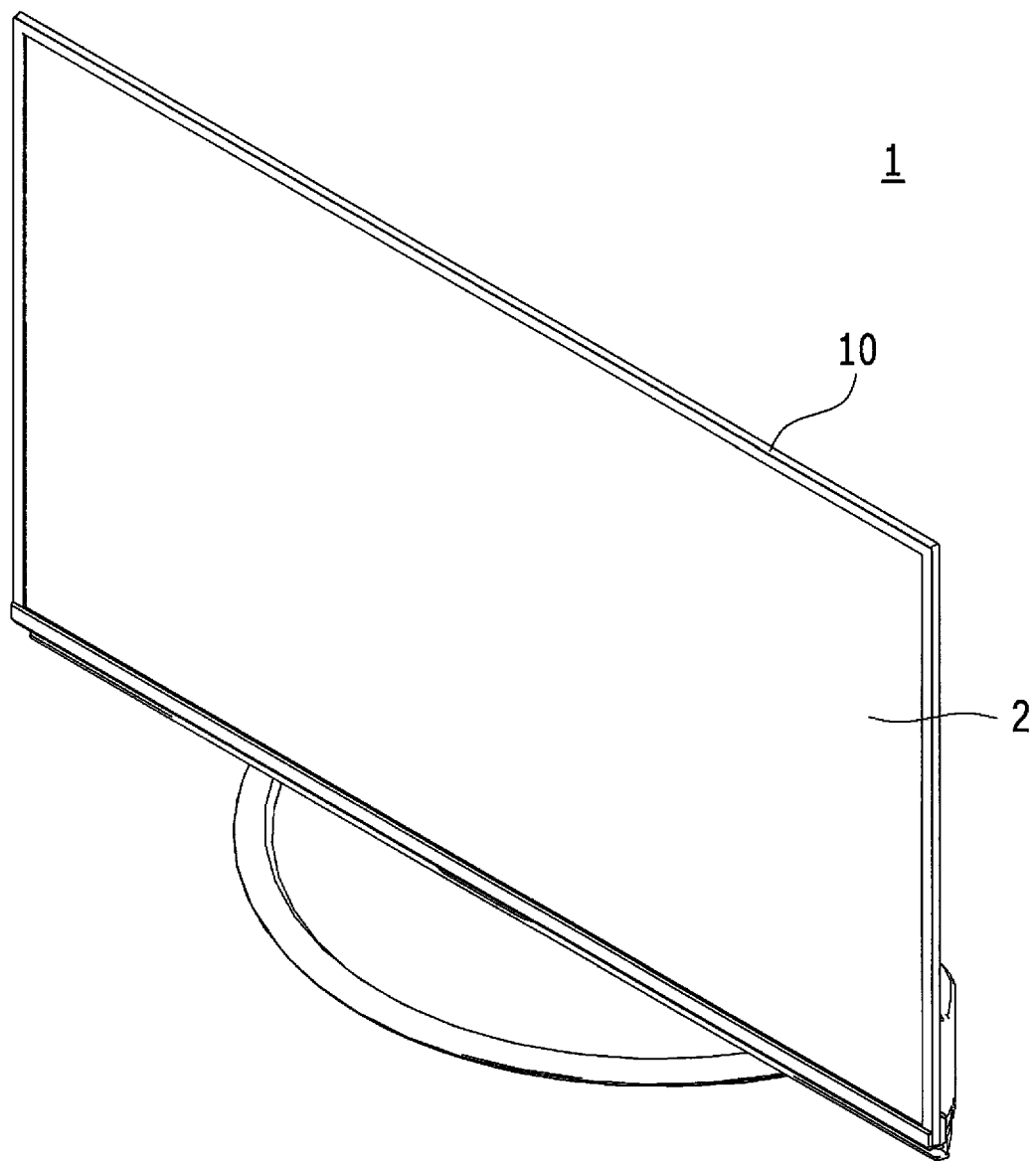
FIG. 1 is a perspective view schematically illustrating an example of external appearance of a display apparatus according to the present disclosure.
Figure 2:
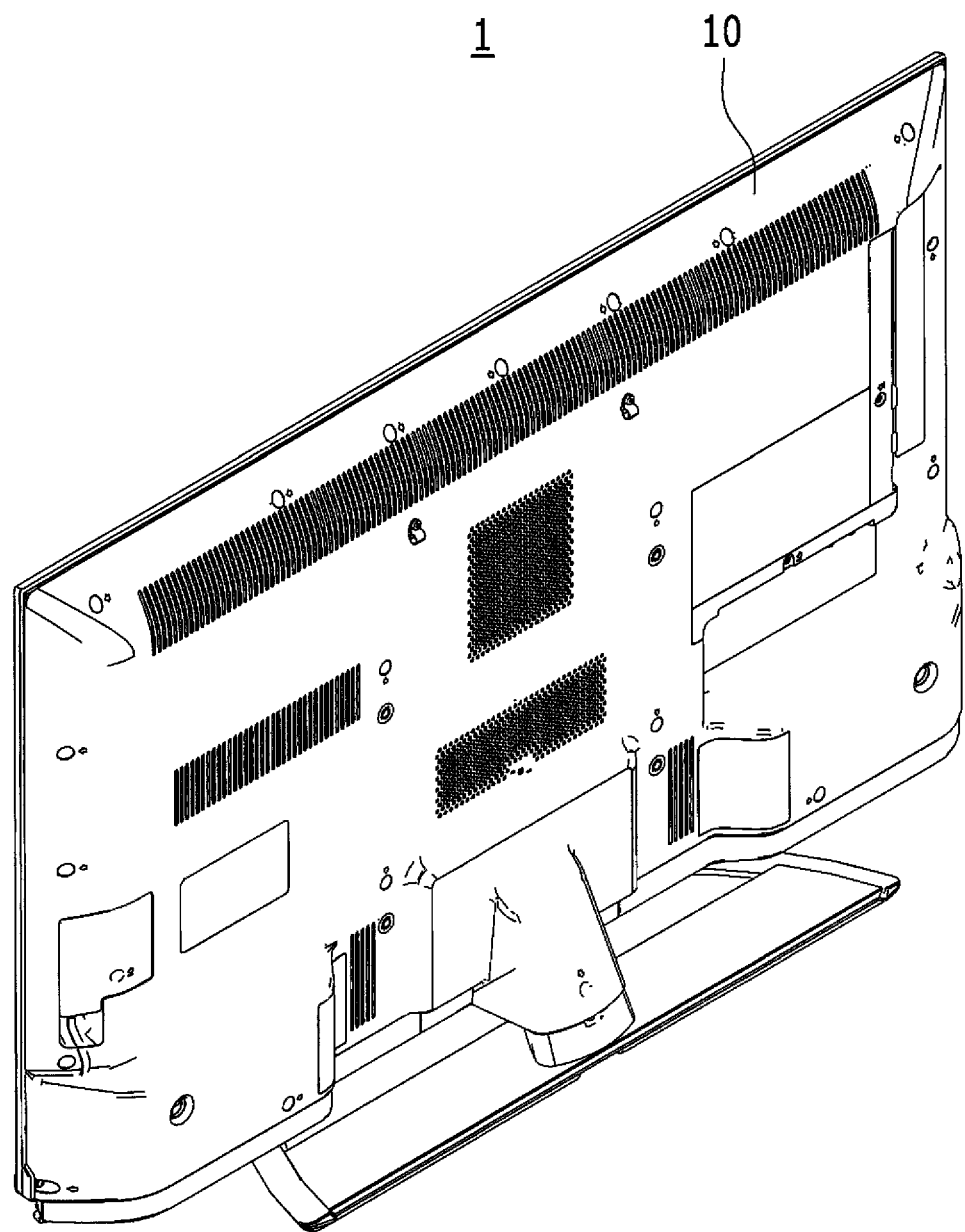
FIG. 2 is a perspective view schematically illustrating an example of external appearance of the display apparatus according to the present disclosure.

FIG. 1 and FIG. 2 are perspective views schematically illustrating an example of external appearance of a display apparatus 1 according to the present disclosure. In FIG. 1, the display apparatus 1 is viewed from a point located diagonally above and in front of the display apparatus 1. In FIG. 2, the display apparatus 1 is viewed from a point located diagonally above and in rear of the display apparatus 1. FIGS. 1 and 2 illustrate an example in which the display apparatus 1 according to the present disclosure is applied to a liquid crystal television set. The display apparatus 1 is shaped such that a leg is attached to a housing 10 that is shaped substantially like a thin cuboid having a short dimension in a depth direction. A light emitting device 2 that displays images is installed in a front region of the housing 10.

Figure 3:
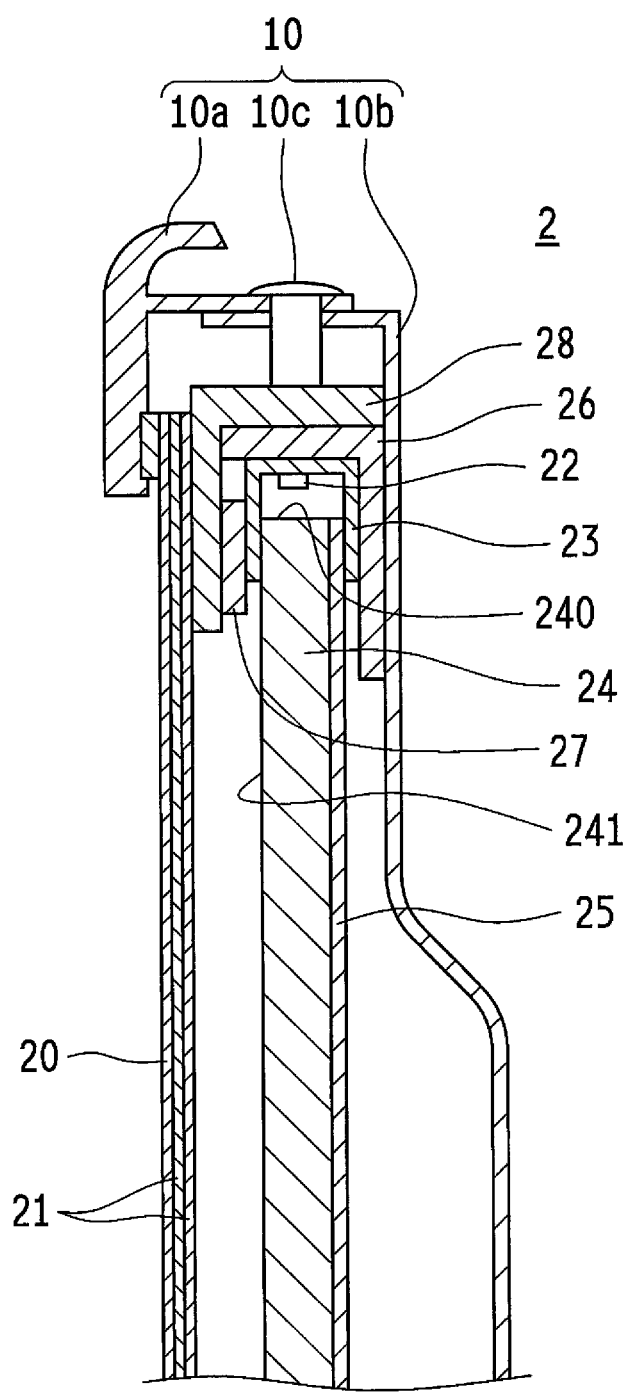
FIG. 3 is a cross-sectional view schematically illustrating an example of part of a light emitting device installed in the display apparatus according to the present disclosure.
Figure 4:
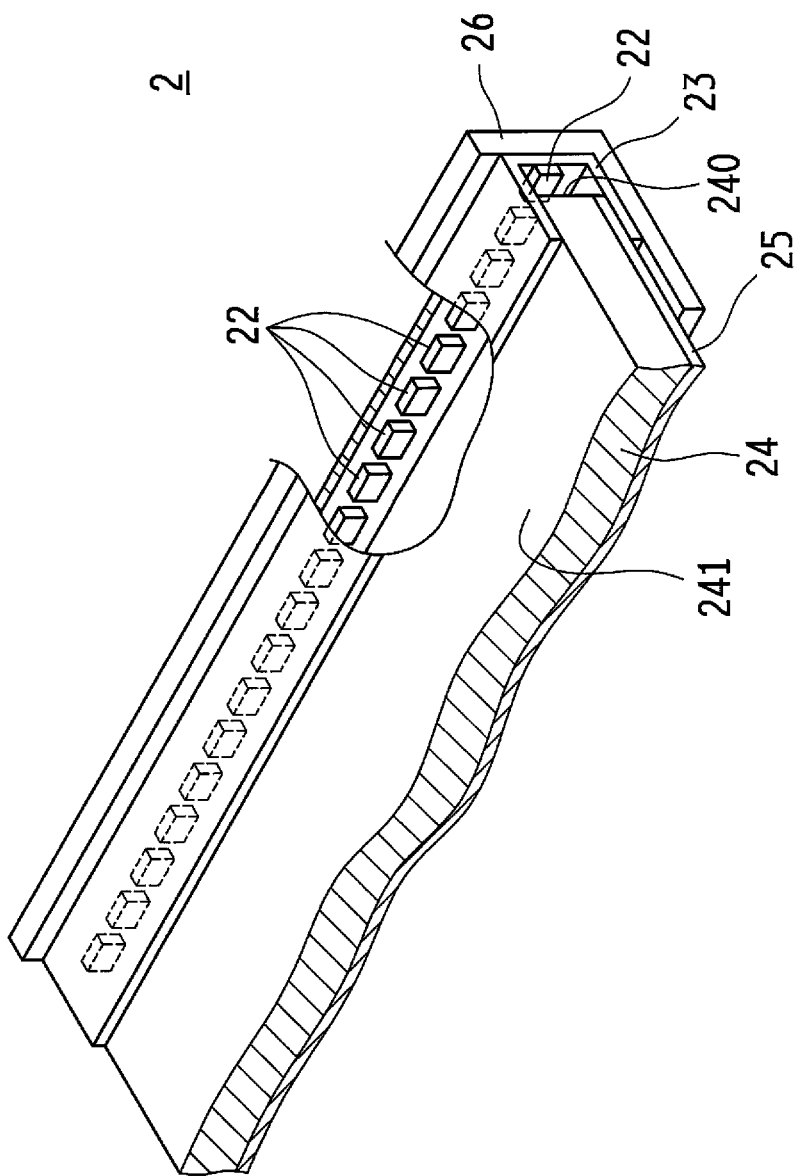
FIG. 4 is a partially broken perspective view schematically illustrating an example of part of the light emitting device according to the present disclosure.

The light emitting device 2 will be described in details below. FIG. 3 is a cross-sectional view schematically illustrating an example of part of the light emitting device 2 installed in the display apparatus 1 according to the present disclosure. FIG. 4 is a partially broken perspective view schematically illustrating an example of part of the light emitting device 2 according to the present disclosure. FIG. 3 illustrates a cross section of the light emitting device 2 in the state in which the light emitting device 2 is installed in the display apparatus 1. The front surface of the display apparatus 1 is shown on the left in FIG. 3. Light is emitted from the front surface located on the left in FIG. 3, and accordingly images are displayed in this direction. The top surface of the display apparatus 1 is shown on the upper side in FIG. 3. FIG. 4 is a perspective view illustrating part of the light emitting device 2, in which part of the structure is taken away so as to facilitate a better understanding of the internal configuration. When viewing FIG. 4, the front portion of the display apparatus 1 in which the light emitting device 2 is installed faces an upper left region on the near side in the figure.

The housing 10 of the display apparatus 1 includes a front cabinet 10a and a rear cabinet 10b as the front portion and the rear portion of the housing 10. The housing 10 is formed by fitting the front cabinet 10a and the rear cabinet 10b together in the front-rear direction in the state in which the light emitting device 2 is accommodated therein. The top side of the housing 10 is formed of the top side of the front cabinet 10a and the top side of the rear cabinet 10b that overlap each other, and the overlapping portions are fixed by means of screws 10c.

The light emitting device 2 accommodated in the housing 10 of the display apparatus 1 includes a liquid crystal panel 20, an optical sheet 21, a light source 22, a substrate 23, a light guiding plate 24, a light reflecting sheet 25, a heat radiating member 26, an elastic member 27, a chassis 28, and other miscellaneous components. Note that among components included in the light emitting device 2, FIG. 4 illustrates light sources 22, the substrate 23, the light guiding plate 24, the light reflecting sheet 25, and heat radiating member 26 in a perspective view for a better understanding of their shapes and arrangement. Especially a portion in which light sources 22 are disposed is illustrated in a partially broken view.

The liquid crystal panel 20 and double layer optical sheet 21, which are shaped like rectangular sheets, are disposed so as to overlap each other on the front surface (on the left side in FIG. 3) of the light emitting device 2. The liquid crystal panel 20 disposed at the frontmost portion has a liquid crystal that includes a number of pixels. The liquid crystal is formed such that each of the pixels transmits or blocks incident light in response to the state of voltage applied to each pixel so as to cause the liquid crystal as a whole to display an image. The double layer optical sheet 21, which overlaps the rear surface of the liquid crystal panel 20, is formed of polarizing filters having different polarization directions. Most part of the front surface of the liquid crystal panel 20 is exposed from the front cabinet 10a so that viewers can view images displayed on the liquid crystal panel 20.

A chassis 28 is disposed behind an upper end portions of the liquid crystal panel 20 and the optical sheet 21. The liquid crystal panel 20 and the optical sheet 21 are fixed in the housing 10 by the front cabinet 10a from in front and by the chassis 28 from behind. The chassis 28 is formed into an elongated shape extending in the right-left direction within the display apparatus 1, and the cross section of the chassis 28 is shaped substantially like a letter L. The chassis 28 shaped substantially like a letter L has a vertical portion that aligns with the vertical face of the chassis 28 and a horizontal portion that aligns with the horizontal face thereof. The liquid crystal panel 20 and the optical sheet 21 are disposed on the front side of the vertical portion of the chassis 28. Members such as the light sources 22, the substrate 23, and the light guiding plate 24 are disposed behind the vertical portion and under the horizontal portion, in other words, inside the chassis 28.

The light source 22 is formed of a light emitting device that emits light, such as a light emitting diode (LED) chip, and is disposed on the substrate 23 on which a wiring pattern connected electrically to the light source 22 is formed. As illustrated in FIG. 4 by way of example, a plurality of light sources 22 are disposed in a row in the right-left direction with a predetermined spacing therebetween on the substrate 23 that is elongated in the right-left direction. The substrate 23 is formed into a substantially U shape by bending a metal sheet at a right angle along two parallel fold lines. The substrate 23 is disposed such that the surfaces of the portions bent from the substrate 23 are positioned in front of and behind the light sources 22, respectively, and the surface of the central portion is positioned above the light sources 22. The substrate 23 is made of a metal such as aluminum or copper. The wiring pattern may be formed on the surface of the central portion and on the front and rear surfaces that are the surfaces of the portions bent from the substrate 23. These inside surfaces of the substrate 23, which face the light sources 22, are treated by mirror finishing by using a metal material such as a copper foil, thereby exhibiting a high reflectance of 80 to 90% or more for the light emitted by the light sources 22.

The light sources 22 are surrounded by the substrate 23 except for the bottom side. The light sources 22 thereby emit light downward. The light guiding plate 24 is shaped like a thin board and is disposed under the light sources 22. The light guiding plate 24 shaped like a thin board is disposed in parallel with the liquid crystal panel 20 and the optical sheet 21. The top side of the light guiding plate 24 adjacent to the light sources 22 is formed as a light receiving portion 240 that receives light from the light sources 22. The substrate 23 that is bent is disposed such that the light sources 22 and optical paths from the light sources 22 to the light receiving portion 240 are surrounded by the substrate 23 except for the bottom side. In other words, with respect to the light sources 22, the substrate 23 is disposed opposite to the light guiding plate 24. A first edge portion of the substrate 23 is bent toward the front surface of the light guiding plate 24 and a second edge portion is bent toward the rear surface of the light guiding plate 24, and the first edge portion and the second edge portion cover the optical paths from the light sources 22 to the light receiving portion 240. Here, "covering the optical paths" means that regions in front of and behind the optical paths from the light sources 22 to the light receiving portion 240 are closed but regions at the right and at the left of the optical paths may be open. In the illustrated example, the first edge portion, which is a portion bent from the substrate 23, overlaps the front surface of the light guiding plate 24 at a position near the light receiving portion 240, and the second edge portion overlaps the light reflecting sheet 25 disposed on the rear surface of the light guiding plate 24 at a position near the light receiving portion 240. Thus, the first edge portion and the second edge portion cover the regions in front of and behind the optical paths.

The light reflecting sheet 25 that reflects light is disposed on the rear surface of the light guiding plate 24. The light reflecting sheet 25, which is a sheet-like light reflecting member, reflects the light that has been received at the light receiving portion 240 and introduced into the light guiding plate 24. The front surface of the light guiding plate 24 serves as a light emitting surface 241. The light introduced into the light guiding plate 24 is emitted from the light emitting surface 241 toward the liquid crystal panel 20 and the optical sheet 21.

The substrate 23 is in contact with a heat radiating member 26, such as a heat spreader. The heat radiating member 26 is formed of a metal sheet by bending the metal sheet into a substantially L shape in the cross section. Adjacent outer surfaces of the substrate 23 with a bent portion interposed therebetween, in other words, the top surface and the rear surface of the substrate 23 in the illustrated example, are in contact with the heat radiating member 26. Put another way, the heat radiating member 26 that is bent into a substantially L shape is in contact with a plurality of surfaces of the substrate 23 with a bent portion interposed therebetween. In other words, the heat radiating member 26 has a flat surface that is in contact with the top surface of the substrate 23, which is a surface opposite to the surface on which the light sources 22 are disposed. The heat radiating member 26 also has another flat surface that is in contact with the rear surface of the substrate 23, which is a surface opposite to the surface with which the light reflecting sheet 25 is in contact. Note that the heat radiating member 26 may be formed such that the heat radiating member 26 is in contact with the front surface of the substrate 23 that is opposite to the surface that is in contact with the light emitting surface 241 of the light guiding plate 24. The heat radiating member 26 formed as described above diffuses heat generated by the light sources 22 via the substrate 23 and the heat diffused is released to the external environment.

An elastic member 27 made of a material such as polyurethane foam is disposed between the front surface of the substrate 23 and the chassis 28. The elastic member 27 protects the substrate 23 from external vibrations and impacts.

Function of Light Emitting Device

Next, the function of the light emitting device 2 will be described. FIG. 5A is a view schematically illustrating an exemplary cross section of part of the light emitting device 2 according to the present disclosure. Among the components illustrated in the cross section in FIG. 3, FIG. 5A schematically illustrates the liquid crystal panel 20, the optical sheet 21, one of the light sources 22, the substrate 23, the light guiding plate 24, the light reflecting sheet 25, the heat radiating member 26, the elastic member 27, and the chassis 28, which are included in the light emitting device 2. Optical paths and heat conduction paths are represented by arrows. In FIG. 5A, arrows with solid line indicate optical paths of light emitted from the light source 22 to the light receiving portion 240 of the light guiding plate 24, and arrows with dotted line indicate heat conduction paths. Note that FIG. 5A illustrates the light emitting device 2 according to the present disclosure, whereas FIG. 5B illustrates a known light emitting device 2X, which is given for comparison. The known light emitting device 2X includes a liquid crystal panel 20X, an optical sheet 21X, a light source 22X, a substrate 23X, a light guiding plate 24X, a light reflecting sheet 25X, a heat radiating member 26X, an elastic member 27X, and a chassis 28X. In addition, a retaining member 29X is disposed between the light reflecting sheet 25X and the heat radiating member 26X. Note that the substrate 23X of the known light emitting device 2X given for comparison is shaped like a flat plate having no bent portion.

In the light emitting device 2, light emitted from the light source 22 is received by the light receiving portion 240 located at the top end of the light guiding plate 24. The light guiding plate 24 guides light received at the light receiving portion 240 toward the opposite end of the light guiding plate 24 while light is reflected repeatedly between a front surface (a first surface) and a rear surface (a second surface that opposes the first surface) of the light guiding plate 24. The light reflecting sheet 25 is disposed on the rear surface of the light guiding plate 24. Light received at the light receiving portion 240 and introduced in the light guiding plate 24 is emitted from the front surface (i.e., the light emitting surface 241) of the light guiding plate 24 toward the liquid crystal panel 20 and the optical sheet 21 disposed in front thereof.

As illustrated in FIG. 5A, the substrate 23 is bent to the front surface and also to the rear surface of the light guiding plate 24 so as to cover the optical paths from the light sources 22 to the light receiving portion 240. In other words, the optical paths from the light sources 22 to the light receiving portion 240 are covered by the substrate 23, and the surfaces of the substrate 23 facing the optical paths are treated so as to exhibit a high reflectance of 80 to 90% or more. Accordingly, as indicated by the arrows with solid line in FIG. 5A, light emitted from the light source 22 reaches the light receiving portion 240 directly or by way of reflection on the substrate 23. Thus, the light emitting device 2 according to the present disclosure can reduce the amount of light leakage and improve the rate of light received by the light guiding plate 24, which can thereby make the light emitting device 2 into a high luminance device.

The known light emitting device 2X illustrated in FIG. 5B for comparison exhibits a larger amount of light leakage and a smaller rate of light received compared with the light emitting device 2 according to the present disclosure because, for example, low reflectance members such as the retaining member 29X absorb light and light reflected on the substrate 23X may not fully reach the light receiving portion 240X.

Moreover in the light emitting device 2, heat generated by members such as the light source 22 is conducted to the heat radiating member 26 via the substrate 23, diffused by the heat radiating member 26, and released to the external environment.

As illustrated in FIG. 5A, the substrate 23 that is bent can be formed so as to increase the area of the substrate 23 that is in contact with the heat radiating member 26 and that radiates heat. As indicated by the arrows with dotted line in FIG. 5A, heat can be conducted via various portions of the substrate 23 that are in contact with the heat radiating member 26. This results in an efficient heat conduction and an improvement in the rate of heat radiation. Accordingly, this suppresses the likelihood of the light emitting device 2 being subjected to a high temperature, which suppresses the temperature rise at, for example, soldered portions on the substrate 23 and thereby contributes to stable and safe operation. The substrate 23 made of aluminum exhibits a thermal conductivity of approximately 236 W/mK. The heat radiation efficiency of the substrate 23 improves by increasing the area that is in contact with the heat radiating member 26 and that radiates heat.

The known light emitting device 2X illustrated in FIG. 5B for comparison has a heat radiation efficiency lower than that of the light emitting device 2 according to the present disclosure due to a smaller contact area between the substrate 23X and the heat radiating member 26X, in other words, due to a smaller area through which the substrate 23X radiates heat.

Control Scheme of Display Apparatus

Figure 6:
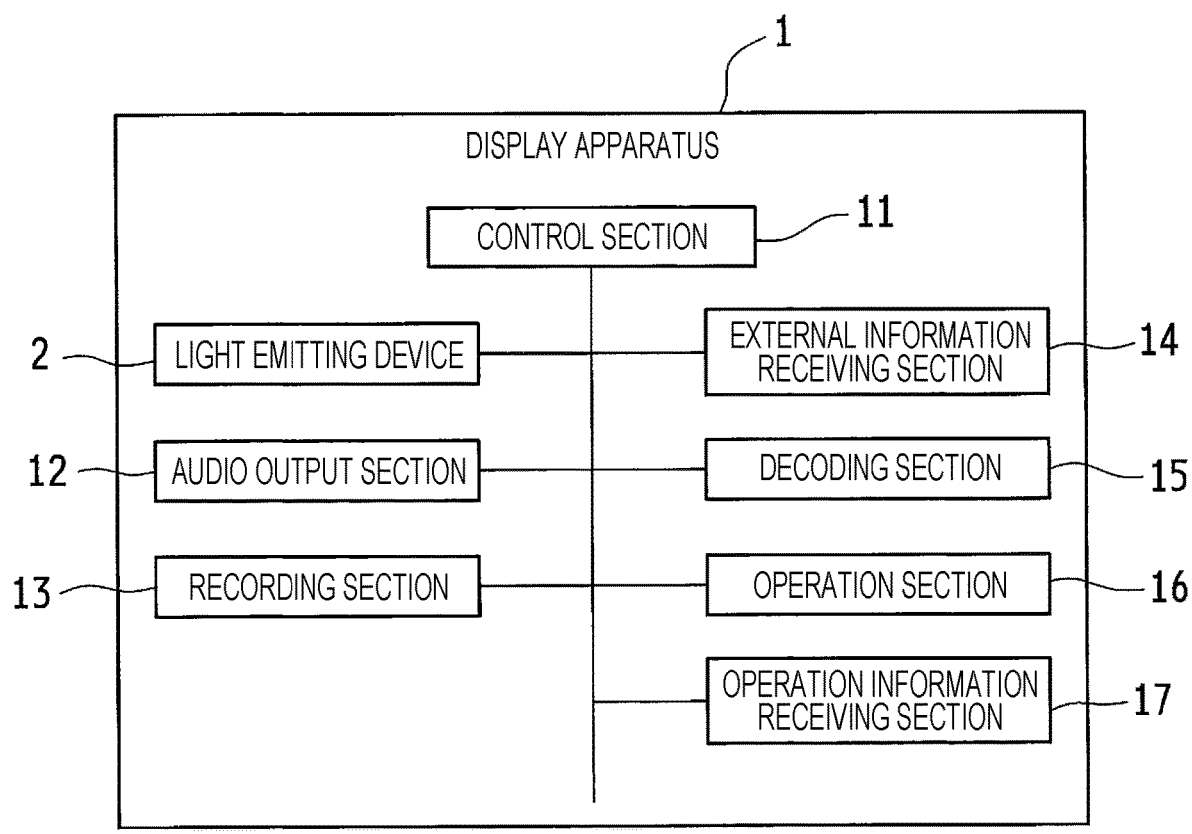
FIG. 6 is a block diagram illustrating an exemplary control scheme of the display apparatus according to the present disclosure.

Next, a configuration example of the control system of the display apparatus 1 according to the present disclosure will be described. FIG. 6 is a block diagram illustrating an exemplary control scheme of the display apparatus 1 according to the present disclosure. The display apparatus 1 includes a control section 11, such as a central processing unit (CPU), for controlling overall operation of the device. In addition to the light emitting device 2 controlled by the control section 11, the display apparatus 1 includes various sections such as an audio output section 12, a recording section 13, an external information receiving section 14, a decoding section 15, an operation section 16, an operation information receiving section 17.

The audio output section 12 is formed of a speaker that outputs a sound in response to an electric signal. The recording section 13 is formed of various types of memories, such as a hard disk and a flash memory. The recording section 13 records various types of information, such as a program to be executed under control of the control section 11, audio information, and video information. The external information receiving section 14 is constituted by an antenna for receiving broadcast waves and a circuit, such as a receiving circuit, for receiving information transmitted from external devices via cable or wireless transmission. The external information receiving section 14 receives audio and video information for outputting a sound and an image synchronously. The decoding section 15 is constituted by a tuner and a circuit, such as a decoding circuit, that decode the audio and video information received by the external information receiving section 14. The control section 11 causes the audio output section 12 to output a sound based on the sound information decoded in the decoding section 15 and also causes the liquid crystal panel 20 of the display apparatus 1 to display an image based on the video information decoded in the decoding section 15. The operation section 16 is a system constituted by members such as operation buttons for receiving operation instructions and a circuit accompanied therewith. The operation information receiving section 17 is a system constituted by an infrared signal receiver and a circuit accompanied therewith for receiving operational information from an external device such as a remote controller.

Second Embodiment

The substrate 23 included in the light emitting device 2 according to the second embodiment has a different shape compared with that in the first embodiment. Note that in the description below, components similar to those described in the first embodiment are denoted by the reference symbols similar to those in the first embodiment, and further description will be omitted.

Figure 7:
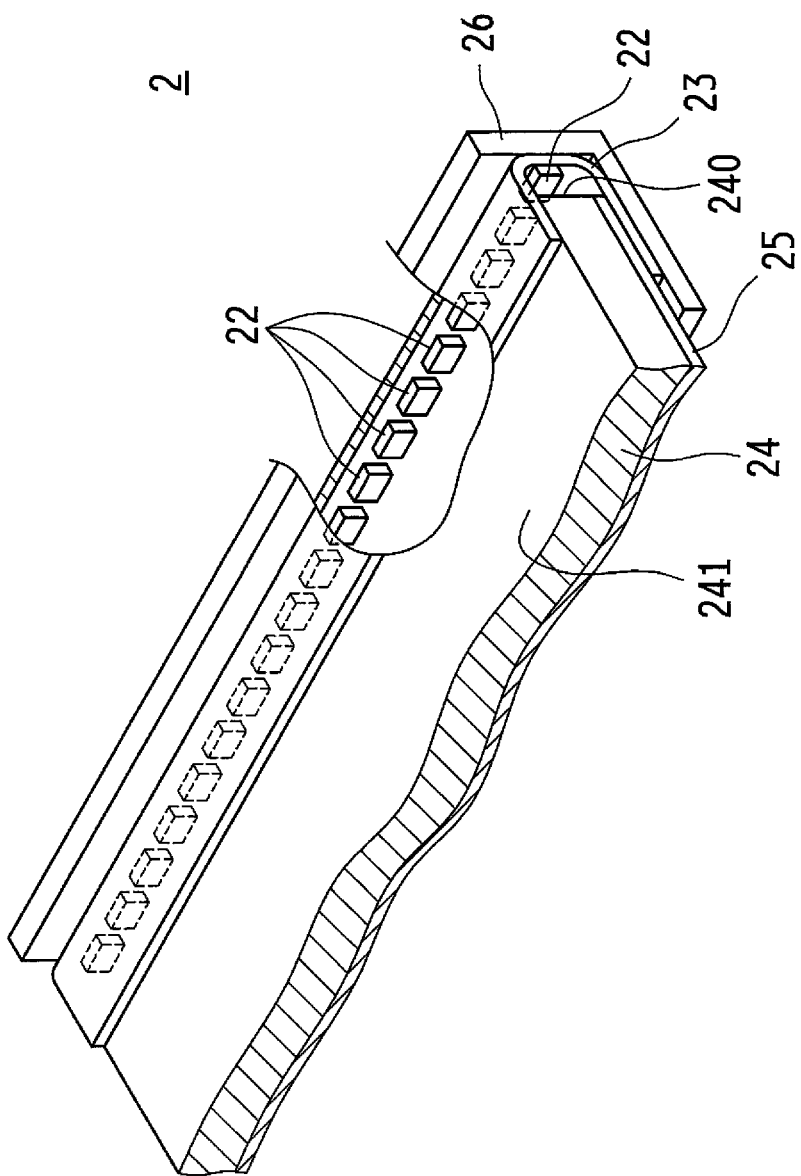
FIG. 7 is a partially broken perspective view schematically illustrating an example of part of the light emitting device according to the present disclosure.

The light emitting device 2 installed in the display apparatus 1 according to the second embodiment is described below. FIG. 7 is a partially broken perspective view schematically illustrating an example of part of the light emitting device 2 according to the present disclosure. FIG. 7 illustrates part of the light emitting device 2 in a perspective view in which part of the structure is taken away so as to facilitate a better understanding of the internal configuration. When viewing FIG. 7, the front portion of the display apparatus 1 in which the light emitting device 2 is installed faces an upper left region on the near side in the figure. Among components included in the light emitting device 2, FIG. 7 illustrates the light sources 22, the substrate 23, the light guiding plate 24, the light reflecting sheet 25, and heat radiating member 26 in a perspective view for a better understanding of their shapes and arrangement. Especially a portion in which the light sources 22 are disposed is illustrated in a partially broken view.

The substrate 23 of the light emitting device 2 according to the second embodiment is formed into a substantially U shape by bending a metal sheet along two parallel lines into an arc shape. The substrate 23 is disposed such that the surfaces of the portions bent from the substrate 23 are positioned in front of and behind the light sources 22, respectively, and the surface of the central portion is positioned above the light sources 22. In other words, the substrate 23 of the light emitting device 2 according to the second embodiment is bent into an arc shape as opposed to the substrate 23 of the light emitting device 2 according to the first embodiment, which is bent at a right angle.

Figure 8:
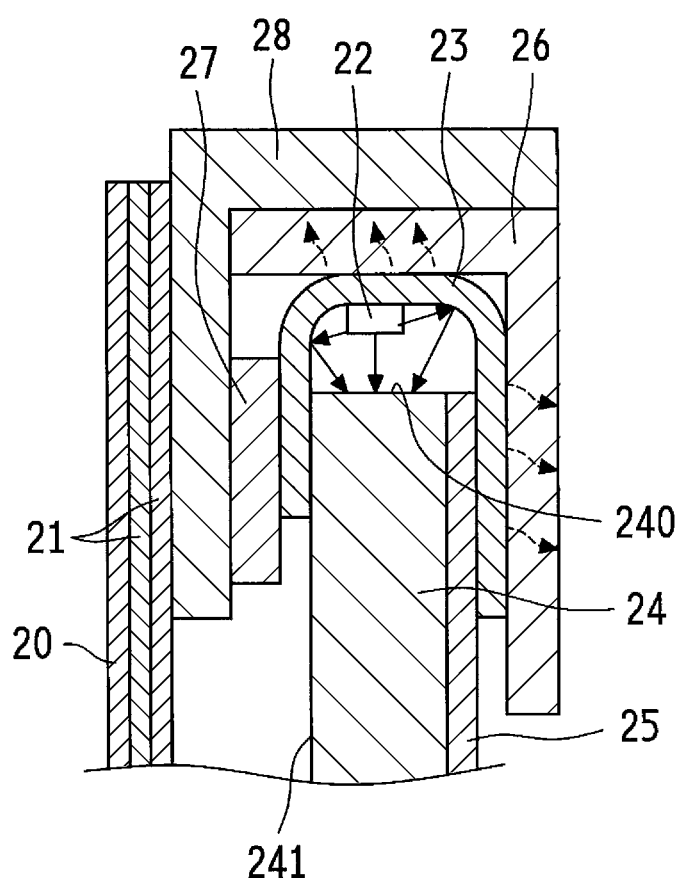
FIG. 8 is a view schematically illustrating an exemplary cross section of part of the light emitting device according to the present disclosure.

FIG. 8 is a view schematically illustrating an exemplary cross section of part of the light emitting device 2 according to the present disclosure. FIG. 8 schematically illustrates the liquid crystal panel 20, the optical sheet 21, one of the light sources 22, the substrate 23, the light guiding plate 24, the light reflecting sheet 25, the heat radiating member 26, and the elastic member 27, which are included in the light emitting device 2. Optical paths and heat conduction paths are represented by arrows. In FIG. 8, arrows with solid line indicate optical paths of light emitted from the light source 22 to the light receiving portion 240 of the light guiding plate 24, and arrows with dotted line indicate heat conduction paths.

In the light emitting device 2 according to the second embodiment, the substrate 23 that is bent into the arc shape can efficiently reflect light emitted in various directions by the light source 22 toward the light receiving portion 240 of the light guiding plate 24. In other words, in the light emitting device 2 according to the second embodiment, the substrate 23 is preferably bent and disposed such that the focus of the reflection surface formed by the bent portion of the substrate 23 is positioned on the light receiving portion 240.

Third Embodiment

The substrate 23 according to the third embodiment is formed into a bent shape by combining three flat pieces of substrate so as to define a space between the light sources 22 and the light receiving portion 240 as opposed to the substrate 23 according to the first embodiment, which is shaped from a single substrate. Figures illustrating the third embodiment are omitted.

As described in the first to third embodiments by way of examples, the substrate 23 of the light emitting device 2 that is built in the display apparatus 1 according to the present disclosure is bent so as to cover a space between the light sources 22 and the light receiving portion 240. This provides advantageous effects. For example, this can make the light emitting device 2 into a high luminance device. Moreover, in the light emitting device 2 built in the display apparatus 1 according to the present disclosure, the substrate 23 that is bent can be formed so as to increase the area of the substrate 23 that is in contact with the heat radiating member 26 and that radiates heat, which can improve the rate of heat radiation.

The present disclosure is not limited to the embodiments described above, but may be implemented in various forms. Accordingly, the embodiments described are merely examples and should not be construed as limiting the scope of the disclosure. The scope of the disclosure is defined by the scope of the appended claims and not be limited by wording in the specification.

For example, the light emitting device 2 installed in the display apparatus 1 to be used in a liquid crystal television set has been described in the embodiments above. However, the present disclosure is not limited to this particular form. The light emitting device 2 may be installed in various types of display apparatuses 1, such as a monitor for computer that displays various images, rather than the liquid crystal television set. The light emitting device 2 according to the present disclosure may be installed in various apparatuses other than the display apparatus 1.

In the above embodiments, the substrate 23 has been described, by way of example, as overlapping a portion of the light reflecting sheet 25 disposed on the rear side of the light guiding plate 24 at a position near the light receiving portion 240. However, the substrate 23 may cover the whole area of the light reflecting sheet 25. Moreover, in the above embodiments, the substrate 23 has been described, by way of example, as covering the front side and the rear side of the optical paths from the light sources 22 to the light receiving portion 240. However, the substrate 23 need not cover the optical paths entirely. In other words, it is sufficient that either the first edge portion (or the front portion) bent from the substrate 23 or the second edge portion (or the rear portion) bent therefrom reaches the light receiving portion 240. In other words, the substrate 23 may cover the whole of or a portion of the optical paths.

The light emitting device 2 according to the present disclosure includes the light source 22 that emits light, the light guiding plate 24 having the light receiving portion 240 that receives light from the light source 22, and the substrate 23 having a wiring pattern that is electrically connected to the light source 22. In the light emitting device 2, the light guiding plate 24 is a light emitting device that emits the received light, and the substrate 23 is bent and disposed so as to cover a space between the light source 22 and the light receiving portion 240.

The light emitting device 2 according to the present disclosure reduces the amount of light leakage by bending the substrate 23 so as to cover a space between the light sources 22 and the light receiving portion 240.

In addition, the light emitting device 2 according to the present disclosure includes the light source 22 that emits light, the light guiding plate 24 that has a first surface and a second surface opposing the first surface and has the light receiving portion 240 that receives the light from the light source 22 and guides the received light between the first surface and the second surface, the substrate 23 having a wiring pattern that is electrically connected to the light source 22. In the light emitting device 2, the substrate 23 has a first edge portion and a second edge portion and is disposed at a position opposite to the light guiding plate 24 with respect to the light source 22. The first edge portion is bent toward the first surface of the light guiding plate 24 and the second edge portion is bent toward the second surface of the light guiding plate 24, and the first edge portion and the second edge portion cover an optical path from the light source 22 to the light receiving portion 240.

The light emitting device 2 according to the present disclosure thereby reduces the amount of light leakage by covering the optical paths between the light source 22 and the light receiving portion 240.

In the light emitting device 2 according to the present disclosure, the light receiving portion 240 is located at an end of the light guiding plate 24. The first surface of the light guiding plate 24 is a light emitting surface 241 that emits the received light, and the light guiding plate 24 has a light reflecting member (light reflecting sheet 25) that is disposed on the second surface and reflects the received light. The first edge portion of the substrate 23 overlaps the first surface of the light guiding plate 24 at a position near the light receiving portion 240, and the second edge portion of the substrate 23 overlaps the light reflecting member (light reflecting sheet 25).

In the light emitting device 2 according to the present disclosure, the second surface of the light guiding plate 24 serves as the light reflecting surface and the first surface of the light guiding plate 24 serves as the light emitting surface 241, and the light emitting device 2 emits light from the light emitting surface 241.

In the light emitting device 2 according to the present disclosure, the substrate 23 has a light reflecting surface that reflects light and that faces the optical path from the light source 22 to the light receiving portion 240.

In the light emitting device 2 according to the present disclosure, the substrate 23 covers optical paths, and the bent reflecting surface of the substrate 23 reflects light emitted from the light source 22, which suppresses the attenuation of light intensity and thereby makes the light emitting device 2 into a high luminance device.

The light emitting device 2 according to the present disclosure further includes the heat radiating member 26 that diffuses heat. The substrate 23 has a bent portion and adjacent portions with the bent portion interposed therebetween, and the adjacent portions are in contact with the heat radiating member 26.

In the light emitting device 2 according to the present disclosure, the bent substrate 23 can be formed so as to increase the area of the substrate 23 that is in contact with the heat radiating member 26 and that radiates heat.

The display apparatus 1 according to the present disclosure includes the light emitting device 2 and the liquid crystal panel 20 that is irradiated with light emitted from the light guiding plate 24 disposed in the light emitting device 2.

The display apparatus 1 according to the present disclosure includes the light emitting device 2 having the substrate 23 that is bent so as to cover a space between the light sources 22 and the light receiving portion 240, which can reduce the amount of light leakage.

The display apparatus 1 according to the present disclosure further includes a receiving section (external information receiving section 14) that receives video information for displaying an image on the liquid crystal panel 20 from outside.

The display apparatus 1 according to the present disclosure can be applied to an apparatus such as a liquid crystal television set that receives video information from outside and displays images based on the video information.

The substrate 23 according to the present disclosure to be used in the light emitting device 2 includes a wiring pattern that is electrically connected to the light source 22 that emits light to be received by the light receiving portion 240 of the light guiding plate 24, and the substrate 23 is bendable so as to cover a space between the light source 22 and the light receiving portion 240.

The substrate 23 according to the present disclosure can thereby reduce the amount of light leakage in the light emitting device 2.

The present disclosure contains subject matter related to that disclosed in Japanese Priority Patent Application JP 2018-020312 filed in the Japan Patent Office on Feb. 7, 2018, the entire contents of which are hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A light emitting device comprising:
a light source that emits light;
a light guiding plate having a light receiving portion that receives the light from the light source; and
a substrate having a wiring pattern that is electrically connected to the light source, wherein
the light guiding plate is a light emitting device that emits the light received by the light receiving portion,
the light emitting device includes a heat radiating member that diffuses heat,
the substrate is bent and disposed so as to cover a space between the light source and the light receiving portion,
the substrate has at least one bent portion and adjacent portions with the at least one bent portion interposed therebetween, and the adjacent portions are in contact with the heat radiating member, and
the heat radiating member is disposed so as to cover the substrate.

2. The light emitting device according to claim 1, wherein the substrate has a light reflecting surface that reflects light and faces the optical path from the light source to the light receiving portion.

3. A display apparatus, comprising:
the light emitting device according to claim 1; and
a liquid crystal panel that is irradiated with light emitted from the light guiding plate disposed in the light emitting device.

4. The display apparatus according to claim 3, further comprising:
a receiving section that receives, from outside, video information for displaying an image on the liquid crystal panel.

5. A substrate to be used in the light emitting device according to claim 1, the substrate comprising a wiring pattern formed thereon, the wiring pattern being electrically connected to a light source that emits light to be received by a light receiving portion of a light guiding plate, the substrate being bendable so as to cover a space between the light source and the light receiving portion.

6. A light emitting device, comprising:
a light source that emits light;
a light guiding plate that has a first surface and a second surface opposing the first surface and has a light receiving portion that receives the light from the light source and guides the received light between the first surface and the second surface; and
a substrate having a wiring pattern that is electrically connected to the light source, wherein
the light emitting device includes a heat radiating member that diffuses heat,
the substrate has a first edge portion and a second edge portion and is disposed at a position opposite to the light guiding plate with respect to the light source,
the first edge portion is bent toward the first surface of the light guiding plate and the second edge portion is bent toward the second surface of the light guiding plate,
the first edge portion and the second edge portion cover an optical path from the light source to the light receiving portion,
the substrate has at least one bent portion and adjacent portions with the at least one bent portion interposed therebetween, and the adjacent portions are in contact with the heat radiating member, and
the heat radiating member is disposed so as to cover the substrate.

7. The light emitting device according to claim 6, wherein the light receiving portion is located at an end of the light guiding plate,
the first surface of the light guiding plate is a light emitting surface that emits the received light,
the light guiding plate has a light reflecting member that is disposed on the second surface and reflects the received light,
the first edge portion of the substrate overlaps the first surface of the light guiding plate at position near the light receiving portion, and
the second edge portion of the substrate overlaps the light reflecting member.

* * * * *